(12) United States Patent
Bae

(10) Patent No.: US 8,026,452 B2
(45) Date of Patent: Sep. 27, 2011

(54) CABLE COUPLER FOR CONNECTION OF ARMORED CABLE HAVING ARMOR LAYER AND METHOD OF HOLDING THE ARMOR LAYER

(75) Inventor: Jun-Jip Bae, Seoul (KR)

(73) Assignee: Dong-A Bestech Co., Ltd., Buchon (KR)

( * ) Notice: Subject to any disclaimer, the term of this patent is extended or adjusted under 35 U.S.C. 154(b) by 776 days.

(21) Appl. No.: 12/149,489

(22) Filed: May 2, 2008

(65) Prior Publication Data

US 2009/0272575 A1    Nov. 5, 2009

(51) Int. Cl.
*H02G 3/18*    (2006.01)
(52) U.S. Cl. ........ 174/650; 174/665; 174/660; 174/663; 29/428
(58) Field of Classification Search .................. 174/650, 174/665, 660, 663; 29/428
See application file for complete search history.

(56) References Cited

U.S. PATENT DOCUMENTS

| 7,504,582 | B1 * | 3/2009 | Chiu | 174/650 |
| 7,728,235 | B2 * | 6/2010 | Mann | 174/650 |

* cited by examiner

*Primary Examiner* — Dhirubhai Patel
(74) *Attorney, Agent, or Firm* — Kratz, Quintos & Hanson, LLP

(57) ABSTRACT

Disclosed herein is a cable coupler for the connection of an armored cable having an armor layer. The cable coupler of the present invention includes a sleeve, which has an inclined surface, which is brought into contact with the armor layer of the armored cable, and a fastening ring and a support ring, each of which has a small width. Each of the fastening ring and the support ring includes inclined surfaces, which are formed by reducing the thickness thereof from a medial portion thereof to opposite ends. The inner inclined surfaces of the fastening ring and the support ring have inclination angles similar to that of the inclined surface of the sleeve. In addition, the armor layer can be firmly held by the cable coupler despite the use of a relatively small force, thus enhancing labor efficiency. As well, armor layers having various thicknesses can be held by the cable coupler merely by changing the positions of the fastening ring and the support ring, thus increasing the usefulness of the cable coupler.

2 Claims, 5 Drawing Sheets

PRIOR ART

PRIOR ART

CABLE COUPLER FOR CONNECTION OF ARMORED CABLE HAVING ARMOR LAYER AND METHOD OF HOLDING THE ARMOR LAYER

BACKGROUND OF THE INVENTION

1. Field of the Invention

The present invention relates generally to cable couplers for the connection of armored cables having armor layers and methods of holding the armor layers and, more particularly, to a cable coupler for the connection of an armored cable having an armor layer which is constructed such that the armor layer, which is formed by weaving pieces of material, such as metal, plastic, fabric, etc., or is made of tape, strips or strands, which are not woven, so as to reinforce the cable, can be reliably grounded to and held by the cable coupler, and such that several kinds of armor layers having various thicknesses can be grounded to and held by the cable coupler merely by changing the positions of a fastening ring and a support ring, thus enhancing the usefulness of the cable coupler, and a method of holding the armor layer using the coupler.

2. Description of the Related Art

Generally, as shown in FIG. 4, in a conventional cable coupler for armored cables, a fastening ring 3 has an angle of inclination such that only one kind of armor layer 1 having a corresponding thickness can be held by the cable coupler. Hence, in the case where a user needs to use several kinds of cables having armor layers of various thicknesses, the user must prepare many kinds of cable couplers corresponding to the thicknesses of the armor layers of the cables, thus increasing the economic burden on the user. Furthermore, manufacturers must also manufacture all kinds of cable couplers corresponding to various thicknesses of the armor layers of the cables, and this is economically irrational. Thus, there are few manufacturers who manufacture all kinds of cable couplers, because this incurs high production costs. As a result, there is a problem in that users may have to select and use unsuitable cable couplers.

In an effort to overcome the problems experienced with the above-mentioned conventional technique, as shown in FIGS. 5A and 5B, a cable coupler having an improved structure was proposed. In this technique, the cable coupler includes a fastening ring 5, the inner surface of which is brought into contact with an inclined surface 4a of an outer surface of a sleeve 4 and includes inclined surfaces 5a and 5b, which are inclined at different angles. As shown in FIGS. 5A and 5B, this cable coupler is constructed such that several kinds of armor layers 1 having different thicknesses can be held between the sleeve 4 and the fastening ring 5 by changing the orientation of the fastening ring 5, which is provided with the inclined surfaces 5a and 5b having different angles of inclination. However, in the conventional cable coupler shown in FIGS. 5A and 5B, in the case where the armor layer 1 to be held by the cable coupler is made of relatively thick wires having a diameter of 1 mm or more, because the width of the fastening ring 5 is relatively large, when the fastening ring 5 is inserted between a cylindrical housing 8 and a sleeve 4 and the cylindrical housing 8 is tightened to an adaptor 7, a large force is required to bend the armor layer 1 made of thick wires. Therefore, there is a disadvantage in that it is difficult to tighten the cylindrical housing 8 to the adaptor 7 using only the hands, and thus a tool such as a spanner is required. Moreover, even when such a tool is used, a large force is required, with the result that labor efficiency is markedly reduced. Furthermore, because the width of the fastening ring 5 is large and large force is required when tightening the cylindrical housing 8 to the adaptor 7 or loosening it therefrom, it is very difficult to confirm whether the armor layer 1 is correctly and reliably connected to the sleeve 4.

SUMMARY OF THE INVENTION

Accordingly, the present invention has been made keeping in mind the above problems occurring in the prior art, and an object of the present invention is to provide a cable coupler for the connection of an armored cable having an armor layer which is constructed such that a grounding function of the armor layer of the armored cable is reliably ensured and several kinds of armor layers having various thicknesses can be grounded to and held by the cable coupler merely by changing the positions of a fastening ring and a support ring, thus enhancing the usefulness of the cable coupler.

Another object of the present invention is to provide a method of holding an armor layer of an armored cable using the cable coupler by which the armor layer can be reliably held by the cable coupler using only a small force, thus enhancing labor efficiency, and which makes it possible to confirm whether the armor layer is correctly connected to a sleeve, thus ensuring a reliable connection.

In order to accomplish the above object, in an aspect thereof, the present invention provides a cable coupler for the connection of an armored cable having an armor layer, including: a sleeve having an inclined surface, an outer surface of which is brought into contact with the inner surface of the armor layer, which protrudes from the armored cable; and a fastening ring and a support ring, which are provided separately from each other and are placed on the inclined surface of the sleeve, each of the fastening ring and the support ring including on the inner surface thereof inclined surfaces, which are formed by reducing the thickness thereof from a medial portion thereof to opposite ends thereof. Of the inclined surfaces of each of the fastening ring and the support ring, at least one inclined surface is parallel to the inclined surface of the sleeve. The inclined surfaces of each of the fastening ring and the support ring have the same angle of inclination. The inner diameter of the fastening ring is greater than that of the support ring, and the fastening ring and the support ring have the same outer diameter.

In another aspect, the present invention provides a method of holding an armor layer of an armored cable using the cable coupler.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, a preferred embodiment of the present invention will be described in detail with reference to the attached drawings.

In the present invention, the term 'armor' means a reinforcing layer, which is formed by weaving pieces of material, such as metal, plastic, fabric, etc., into a net form, or is made of tape, strips or strands, which are not woven, so as to reinforce a cable used in a ship or an oil drilling ship, which is in a place such as the ocean, and severely rolls and pitches. The term 'armor' has been widely used in various fields.

An armored cable C1 includes an armor layer 1, which is disposed between an outer sheath C11 and an inner sheath C12. As the armor layer 1 of the armored cable C1, thick steel wires, which are not woven, may be used, or, alternatively, thin wires, which are woven to have a braided structure, may be used. As well, there are various other types of armor structures, but a detailed description of these will be skipped.

Figure 1:
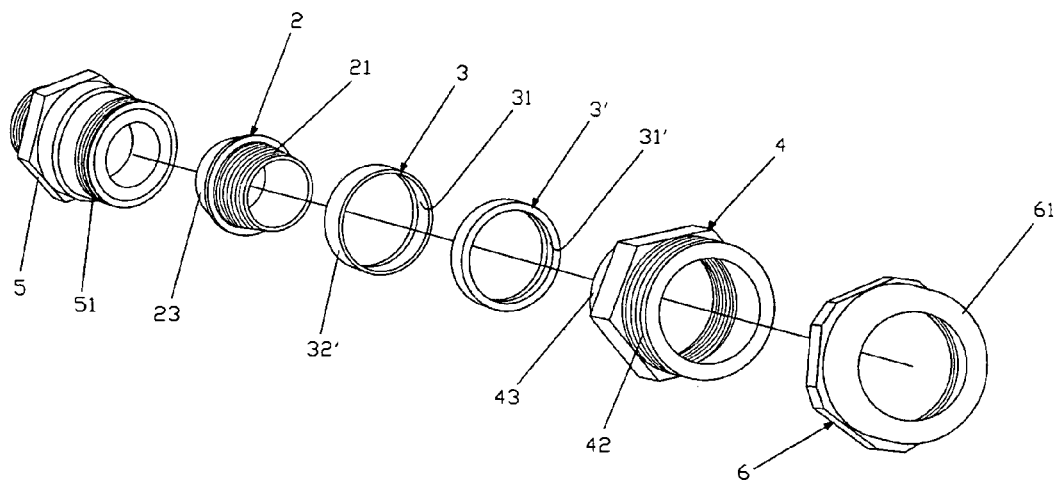
FIG. 1 is an exploded perspective view of a cable coupler for cable connection, according to an embodiment of the present invention.

As shown in FIGS. 1 through 3, a cable coupler A for the connection of an armored cable having an armor layer includes a sleeve 2, which has an inclined surface 21, the outer surface of which is brought into contact with the inner surface of the armor layer 1, which protrudes from the armored cable C1. The cable coupler A further includes a fastening ring 3 and a support ring 3', which are provided separately from each other, and each of which is relatively narrow. Each of the fastening ring 3 and the support ring 3' has on the inner surface thereof inclined surfaces, which are formed by reducing the thickness thereof from the medial portion thereof to the opposite ends. Of the inclined surfaces of each of the fastening ring 3 and the support ring 3', at least one inclined surface is parallel to the inclined surface 21 of the sleeve 2. The inner inclined surfaces 31 and 31' of the fastening ring 3 and the support ring 3' are inclined at an angle similar to that of the inclined surface 21 of the sleeve 2. Here, the inner diameter of the fastening ring 3 is greater than that of the support ring 3'.

Preferably, the fastening ring 3 has a symmetrical structure based on the medial position thereof such that the inclined surfaces 31 formed in the inner surface thereof have the same angle of inclination. The support ring 3' also has a symmetrical structure based on the medial position thereof such that the inclined surfaces 31' formed in the inner surface thereof have the same angle of inclination. Furthermore, the outer diameters 32 and 32' of the fastening ring 3 and the support ring 3' are the same as each other.

The fastening ring 3 and the support ring 3' are disposed in a seating depression 41, which is formed in a cylindrical housing 4. An external thread is formed in the outer surface of a first extension part 42 of the cylindrical housing 4. An internal thread is formed in the inner surface of a second extension part 43 of the cylindrical housing 4. In addition, an external thread is formed in the outer surface of an extension part 51 of a support fastener 5 which is screwed into the second extension part 43.

A cap fastener 6 is screwed to the first extension part 42 of the cylindrical housing 4.

Figure 2A:
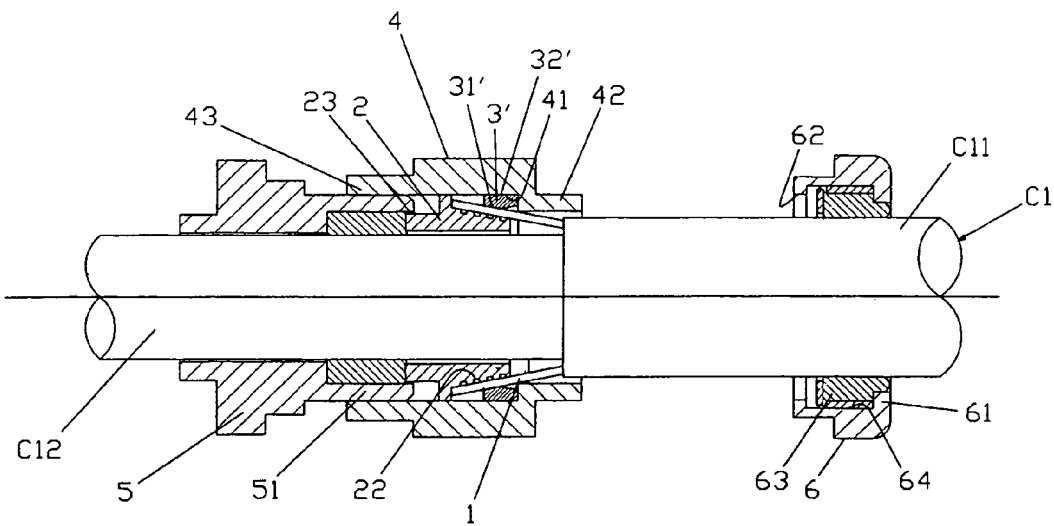
FIGS. 2A, 2B and 2C are longitudinal sectional views illustrating a method of holding an armor layer of the cable coupler of FIG. 1.
Figure 2B:
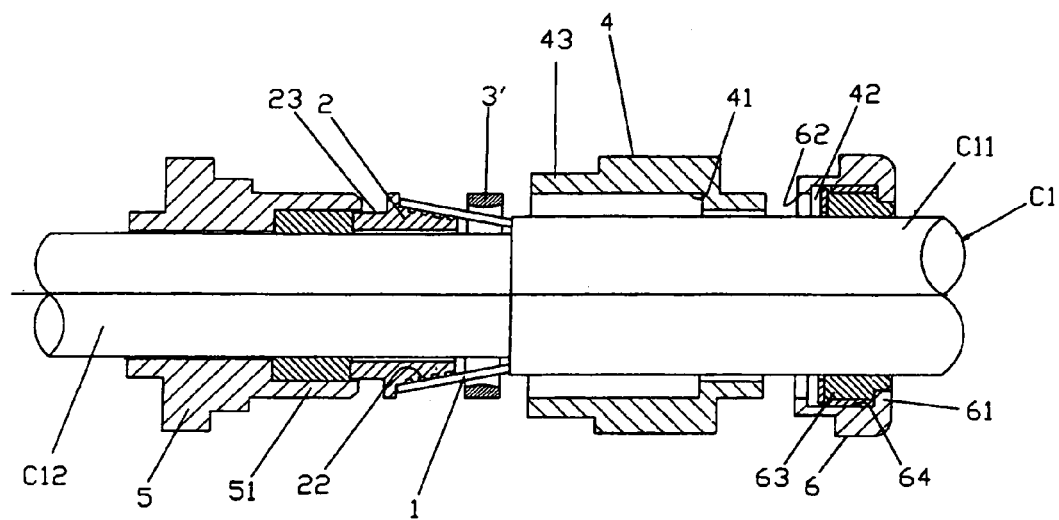
Figure 2C:
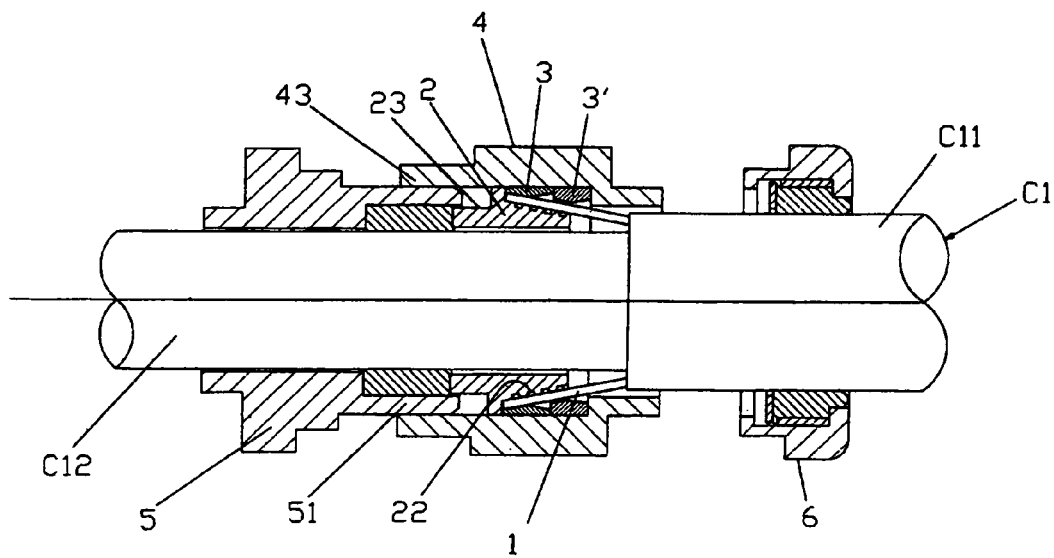

As such, because the present invention has the fastening ring 3 and the support ring 3', which are provided separately from each other, the process of holding the armor layer 1 can be easily conducted. In detail, as shown in FIG. 2A, to preliminarily hold the armor layer 1 using the cable coupler, after the cap fastener 6 and the cylindrical housing 4 are provided on the end of the armored cable C1, the armor layer 1 is placed on the inclined surface 21 of the sleeve 2. Thereafter, only the support ring 3', which has a relatively small inner diameter, is inserted into the cylindrical housing 4. Subsequently, the internal thread of the second extension part 43 of the cylindrical housing 4 is engaged with the external thread of the extension part 51 of the support fastener 5. Here, because only the support ring 3' is placed in the cylindrical housing 4 without the fastening ring 3, a space in which the cylindrical housing 4 is movable, is increased by an amount corresponding to the width of the fastening ring 3. Hence, the second extension part 43 of the cylindrical housing 4 can be easily screwed to the extension part 51 of the support fastener 5 merely using the force of the hands of a worker. In this state, the support ring 3' is brought into contact with the armor layer 1, so that the armor layer 1 is preliminarily bent to have a shape in which the armor layer 1 is held by the cable coupler. Subsequently, as shown in FIG. 2B, the second extension part 43 of the cylindrical housing 4 is loosened from the support fastener 5. Then, the support ring 3', which has been in the cylindrical housing 4, is removed from the cylindrical housing 4, thus making it possible to confirm whether the armor layer 1 is correctly bent and placed on the inclined surface 21 of the sleeve 2. Thereafter, the support ring 3' is moved backwards. As shown in FIG. 2c, the fastening ring 3 is thereafter fitted over the armor layer 1 of the armored cable C1, and the cylindrical housing 4 is screwed to the support fastener 5 again. Then, the cylindrical housing 4 and the support fastener 5 can be easily coupled to each other in the state in which the armor layer 1 is held by the cable coupler, because the armor layer 1 has been preliminarily bent by the support ring 3'. As described above, in the present invention, the fastening ring 3 is seated onto the front end of the armor layer 1 and the support ring 3' supports the fastening ring 3 and the armor layer 1, thus forming a double support structure for the armor layer 1. In addition, the connection of the armored cable C1 can be realized even using a relatively small force.

Figure 3A:
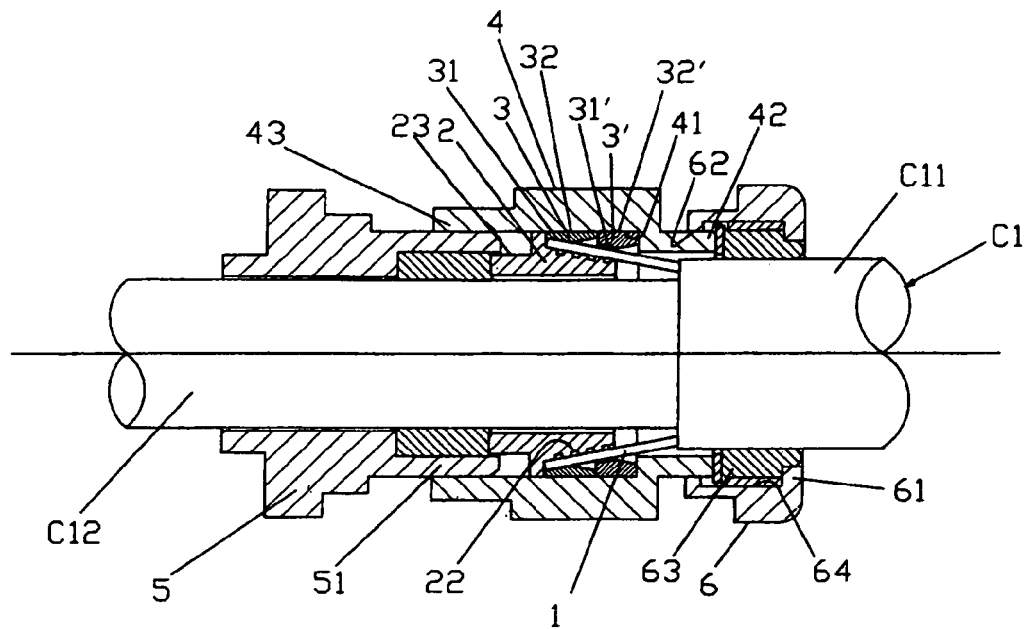
FIGS. 3A and 3B are longitudinal sectional views showing a change in the relative installation positions of a fastening ring of the cable coupler of FIG. 1.
Figure 3B:
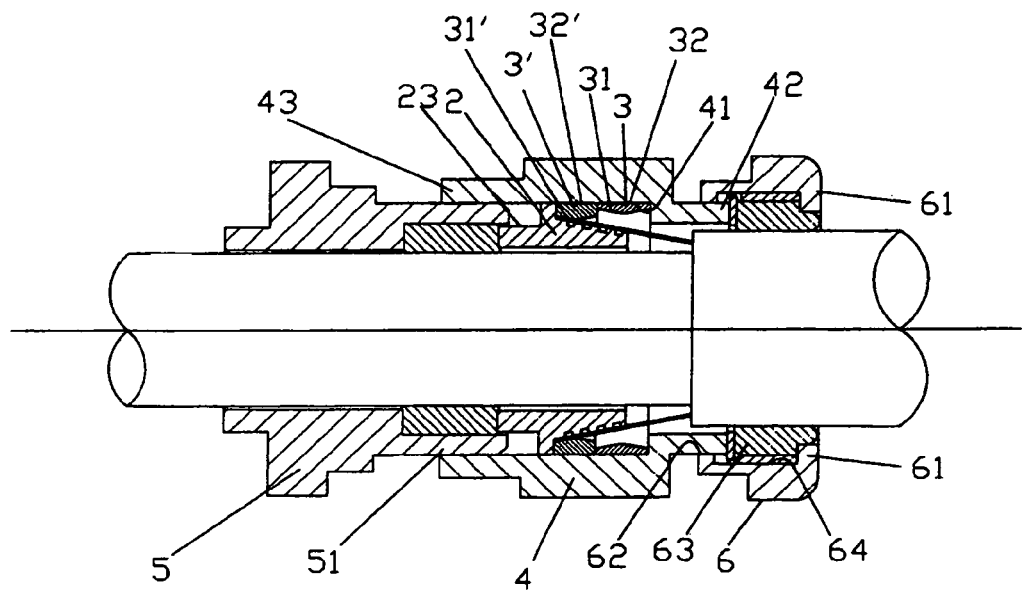
Figure 4:
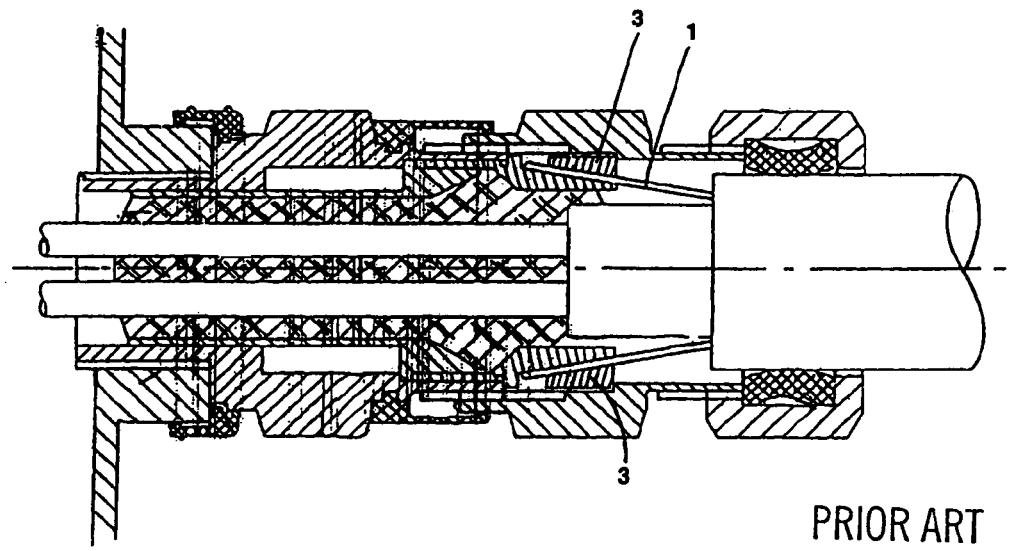
FIG. 4 is a longitudinal sectional view of a conventional cable coupler.
Figure 5A:
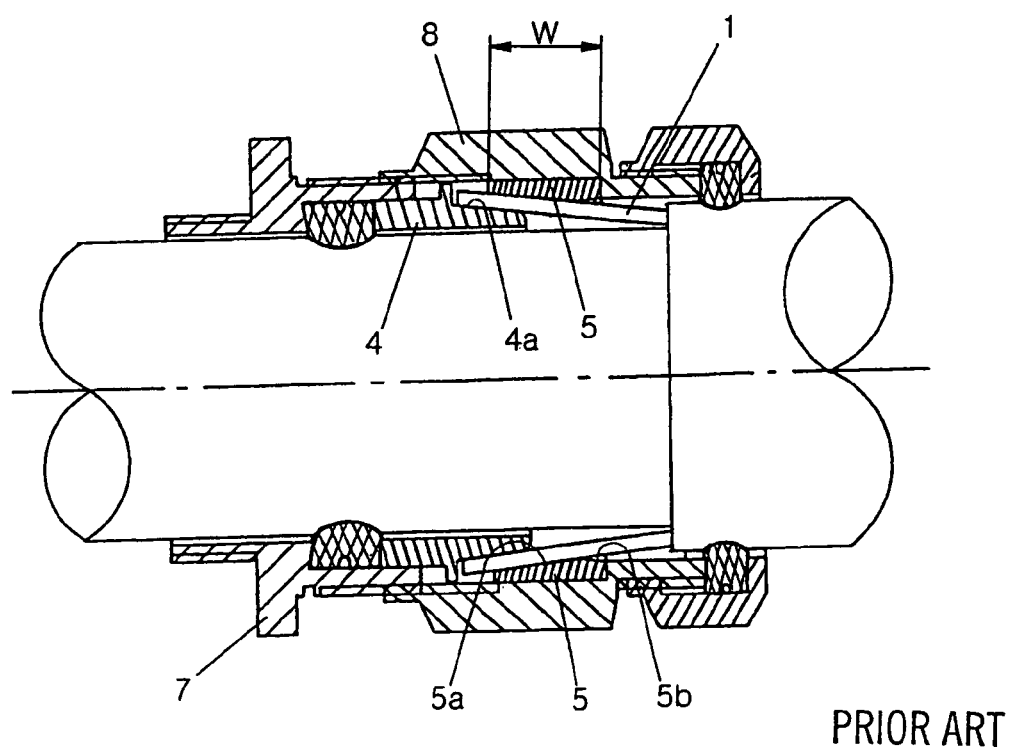
FIGS. 5A and 5B are longitudinal sectional views showing other examples of conventional cable couplers.
Figure 5B:
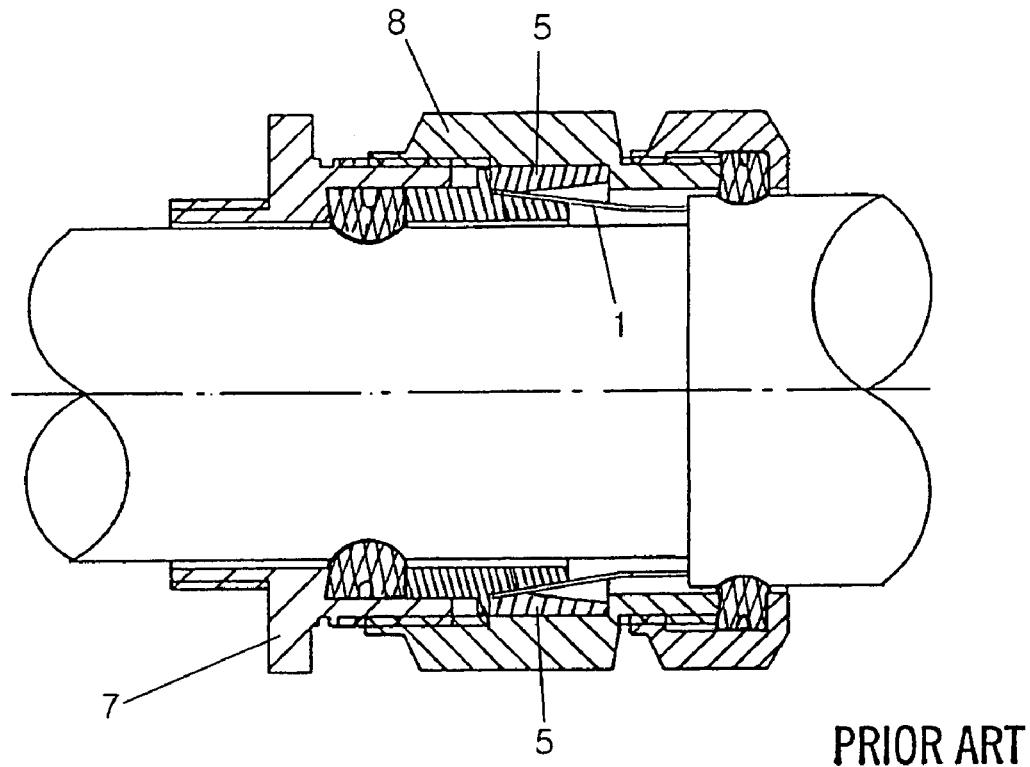
Figure 5C:
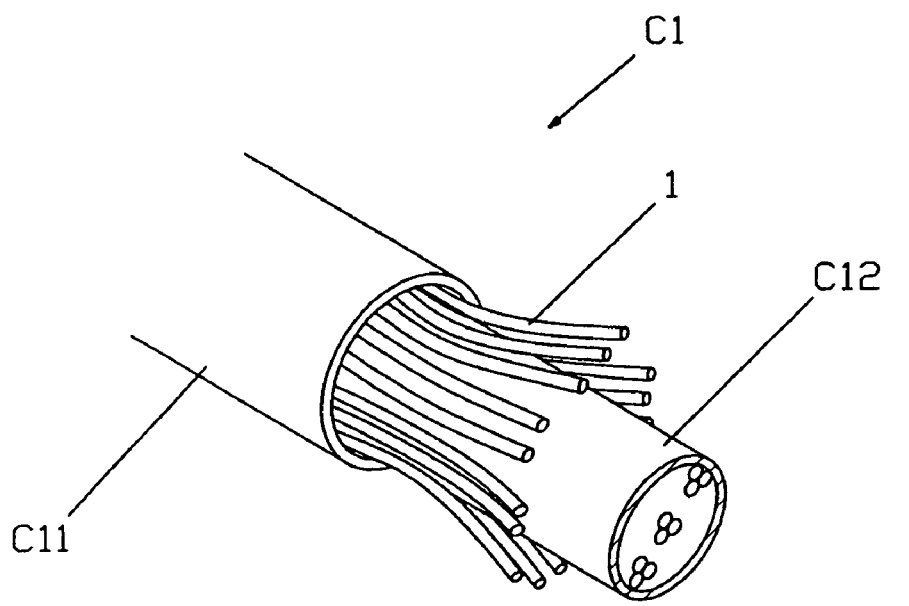
FIG. 5C is a perspective view of the armor layer of the armored cable.

Meanwhile, depending on the kind of the armor layer 1 held by the cable coupler, the relative installation positions of the fastening ring 3 and the support ring 3' may be changed. In detail, as shown in FIG. 3A, in the case where the fastening ring 3, which has a large diameter, and the support ring 3', which has a small diameter, are disposed on the inclined surface 21 of the sleeve 2 in positional sequence from a large diameter part of the inclined surface 21 to a small diameter part thereof, the gap between the inclined surface 21 of the sleeve 2 and the inclined surface 31 of the fastening ring 3 is relatively large, and the gap between the inclined surface 21 of the sleeve 2 and the inclined surface 31' of the support ring 3' is also relatively large. Therefore, in this case, a thick armor layer 1, which is made of relatively thick steel wires, can be held by and grounded to the cable coupler in the double support structure. Meanwhile, as shown in FIG. 3B, in the case where the support ring 3', which has a small diameter, and the fastening ring 3, which has a large diameter, are disposed on the inclined surface 21 of the sleeve 2 in a positional sequence from a large diameter part of the inclined surface 21 to a small diameter part thereof, the gap between the inclined surface 21 of the sleeve 2 and the inclined surface 31' of the support ring 3' becomes relatively small. Therefore, in this case, a thin armor layer 1, which is made of, for example, braided wires, can be held by and grounded to the cable coupler.

A plurality of anti-slip grooves 22 is formed in the inclined surface 21 of the sleeve 2 to prevent the armor layer 1 from being undesirably removed therefrom. An extension part 23, which extends outwards, is provided on the end of the sleeve 2 which is opposite inclined surface 21.

A first end of the support fastener 5 is inserted between the sleeve 2 and the second extension part 43 of the cylindrical housing 4. The first end of the support fastener 5 comprises the extension part 51. The external thread is formed on the extension part 51, so that, when the extension part 51 is inserted between the sleeve 2 and the second extension part 43 of the cylindrical housing 4, the external thread of the extension part 51 engages with the internal thread of the extension part 43 of the cylindrical housing 4.

An annular lip 61 is provided on a first end of the cap fastener 6. An internal threaded part 62, which engages with the external thread of the first extension part 42 of the cylindrical housing 4, is formed on the inner surface of a second end of the cap fastener 6. A seating depression 64, into which a sealing ring 63 is seated, is formed in the cap fastener 6 between the annular lip 61 and the external threaded part 62.

The operation and effect of the cable coupler A for the connection of an armored cable having an armor layer according to the present invention will be explained herein below. When it is desired to ground and hold an armored cable C1 having a thick armor layer 1, which is made of thick steel wires, an armor layer 1 is placed on the inclined surface 21 of the sleeve 2 in the state in which the cap fastener 6 and the cylindrical housing 4 are disposed on the end of the armored cable C1. Therefore, only the support ring 3', which has a relatively small diameter, is inserted into the cylindrical housing 4, and the internal thread of the second extension part 43 of the cylindrical housing 4 engages with the external thread of the extension part 51 of the support fastener 5. Here, because only the support ring 3' is placed in the cylindrical housing 4 without the fastening ring 3, the space within which the cylindrical housing 4 can be moved is increased by an amount corresponding to the width of the fastening ring 3. Hence, the second extension part 43 of the cylindrical housing 4 can be easily screwed to the extension part 51 of the support fastener 5 using only manual force. In this state, the support ring 3' is brought into contact with the armor layer 1, so that the armor layer 1 is preliminarily bent to have a shape in which the armor layer 1 is held by the cable coupler. In this state, the support ring 3' is brought into close contact with the armor layer 1, so that the armor layer 1 is preliminarily bent to have a shape in which the armor layer 1 is held by the cable coupler. Subsequently, the second extension part 43 of the cylindrical housing 4 is loosened from the support fastener 5. Then, the support ring 3', which has been in the cylindrical housing 4, is removed from the cylindrical housing 4, thus enabling confirmation of whether the armor layer 1 is correctly bent and placed on the inclined surface 21 of the sleeve 2. Thereafter, the support ring 3' is moved backwards. As shown in FIG. 2c, the fastening ring 3 is thereafter fitted over the armor layer 1 of the armored cable C1, and the cylindrical housing 4 is screwed to the support fastener 5 again. Then, the cylindrical housing 4 and the support fastener 5 are easily coupled to each other in the state in which the armor layer 1 is held by the cable coupler, because the armor layer 1 has been preliminarily bent by the support ring 3'. Therefore, the present invention can realize a double armor layer support structure, in which the fastening ring 3 is seated onto the front end of the armor layer 1 and the support ring 3' supports the fastening ring 3 and the armor layer 1. In addition, the connection of the armored cable C1 can be realized even using a relatively small force.

Meanwhile, when it is desired to ground and hold an armored cable C1 having a thin armor layer 1, which is made of, for example, braided wires, the fastening ring 3 is first inserted into the cylindrical housing 4 before the support ring 3', the inclined surface 31' of which has a relatively small diameter, is inserted into the cylindrical housing 4. Thereafter, the cylindrical housing 4 is tightened to the support fastener 5 such that the support ring 3' holds the armor layer 1, and the cap fastener 6 is tightened to the cylindrical housing 4. Then, because the gap between the inclined surface 31' of the support ring 3' and the inclined surface 21 of the sleeve 2 is relatively small, the thin armor layer 1, such as braided wires, can be grounded to and firmly held by the cable coupler.

As described above, a cable coupler for the connection of an armored cable having an armor layer according to the present invention includes a sleeve, which has an inclined surface, the outer surface of which is brought into contact with the inner surface of the armor layer, which protrudes from the armored cable, and a fastening ring and a support ring, which are provided separately from each other and are placed onto the inclined surface of the sleeve, and each of which has on the inner surface thereof inclined surfaces, which are formed by reducing the thickness thereof from the medial portion thereof to the opposite ends. Of the inclined surfaces of each of the fastening ring and the support ring, at least one inclined surface is parallel to the inclined surface of the sleeve. The inclined surfaces of each of the fastening ring and the support ring have the same angle of inclination. The inner diameter of the fastening ring is greater than that of the support ring, and the fastening ring and the support ring have the same outer diameter. Therefore, in the present invention, the armor layer can be easily and firmly held by the cable coupler despite the use of a relatively small force, thus enhancing the labor efficiency of a worker. Furthermore, because the present invention enables confirmation of whether the armor layer and the sleeve have been correctly connected, a reliable connection can be ensured. In addition, the grounding function of the armor layer of the armored cable can be reliably ensured. Moreover, in the present invention, armor layers having various thicknesses can be grounded to and held by the cable coupler merely by changing the positions of the fastening ring and the support ring. Accordingly, the usefulness of the cable coupler of the present invention is markedly enhanced.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A method of holding an armor layer of an armored cable, having an end arranged to be grounded and held, using a cable coupler, comprising:
  placing the armor layer on an inclined surface of a sleeve after a cap fastener and a cylindrical housing are provided on said end of the armored cable, inserting a support ring having a smaller inner diameter into the cylindrical housing, and engaging an internal thread, formed in an extension part of the cylindrical housing, with an external thread, formed in an extension part of a support fastener such that the support ring is brought into contact with the armor layer to preliminarily bend the armor layer in a shape in which the armor layer is held by the cable coupler;
  loosening the extension part of the cylindrical housing from the support fastener so that the support ring, which is in the cylindrical housing, is removed from the cylindrical housing, confirming whether the armor layer is correctly bent and placed on the inclined surface of the sleeve, and moving the support ring backwards; and fitting a fastening ring over the armor layer of the armored cable, and screwing the cylindrical housing to the support fastener again, such that the fastening ring is seated onto a front end of the armor layer and the support ring supports the fastening ring and the armor layer to support the armor layer in a double support structure.

2. A cable coupler for connection of an armored cable having an armor layer, between a support fastener and a cylindrical housing with a cap fastener, comprising:

a sleeve having an inclined surface, an outer surface of which is brought into contact with an inner surface of the armor layer, which protrudes from the armored cable; and a fastening ring and a support ring provided separately from each other, and a gap between the inclined surface of the sleeve and each of an inclined surface of the fastening ring and an inclined surface of the support ring, each of the fastening ring and the support ring having a small width and including on an inner surface thereof the inclined surfaces, which are formed by reducing a thickness thereof from a medial portion thereof to opposite ends thereof, wherein, of the inclined surfaces of each of the fastening ring and the support ring, at least one of said inclined surfaces is parallel to the inclined surface of the sleeve, wherein:

the inner inclined surfaces of the fastening ring and the support ring have inclination angles similar to an inclination angle of the inclined surface of the sleeve, and an inner diameter of the fastening ring is greater than an inner diameter of the support ring; and the fastening ring has a symmetrical structure based on a medial position thereof such that the inclined surfaces thereof have the same inclination angle, the support ring has a symmetrical structure based on a medial position thereof such that the inclined surfaces thereof have the same inclination angle, and an outer diameter of the fastening ring is equal to an outer diameter of the support ring.

* * * * *